US012611751B2

(12) United States Patent
Thompson et al.

(10) Patent No.: US 12,611,751 B2
(45) Date of Patent: Apr. 28, 2026

(54) TOOL WITH DOUBLE LEAF SPRING

(71) Applicant: Snap-on Incorporated, Kenosha, WI (US)

(72) Inventors: Christopher D. Thompson, Franklin, WI (US); David T. Ross, Antioch, IL (US)

(73) Assignee: Snap-on Incorporated, Kenosha, WI (US)

( * ) Notice: Subject to any disclaimer, the term of this patent is extended or adjusted under 35 U.S.C. 154(b) by 908 days.

(21) Appl. No.: 16/284,122

(22) Filed: Feb. 25, 2019

(65) Prior Publication Data

US 2020/0269392 A1 Aug. 27, 2020

(51) Int. Cl.

*B25B 13/46* (2006.01)
*B25B 27/30* (2006.01)

(52) U.S. Cl.

CPC .......... *B25B 13/463* (2013.01); *B25B 27/308* (2013.01)

(58) Field of Classification Search

USPC .......... 81/61, 62

See application file for complete search history.

(56) References Cited

U.S. PATENT DOCUMENTS 837,537 A * 12/1906 Beyer .................. B25B 13/463 81/62
1,032,871 A * 7/1912 Bancroft .............. B25B 13/463 81/62
1,438,648 A 12/1922 Jacobs
1,978,935 A 10/1934 Douglas
1,995,610 A 3/1935 Gray
2,321,378 A 6/1943 Green
2,321,379 A 6/1943 Green
2,324,143 A 7/1943 Erdman
2,637,361 A 5/1953 Nagel
2,678,585 A 5/1954 Ellis
2,770,276 A 11/1956 Broder
3,145,750 A 8/1964 Wootton
D200,217 S 2/1965 Curtiss
3,227,199 A 1/1966 Mount
3,245,096 A 4/1966 McKay et al.
3,452,375 A 7/1969 Gabbey (Continued)

FOREIGN PATENT DOCUMENTS

CN 101293340 A 10/2008
CN 101337343 A 1/2009

(Continued)

OTHER PUBLICATIONS

Australian Examination Report No. 1 for Application No. 2019222858 dated Jun. 30, 2020, 8 pages.

(Continued)

*Primary Examiner* — Hadi Shakeri

(74) *Attorney, Agent, or Firm* — Taft, Stettinius & Hollister LLP

(57) ABSTRACT

A dual pawl ratchet tool with a leaf spring bias member. The leaf spring includes two bias portions that are coupled to one another by a fulcrum. The fulcrum can be placed in an indent of the pawl pocket to maintain structural stability while applying a bias force against the engaged pawl. In doing so, the bias member reduces the amount of lost motion that is incurred during the ratcheting operation.

19 Claims, 4 Drawing Sheets

(56) References Cited

U.S. PATENT DOCUMENTS

| | | | | |
|---|---|---|---|---|
| 3,504,579 | A * | 4/1970 | Harlan | B25B 13/463 81/61 |
| 3,542,106 | A | 11/1970 | Busch, Jr. | |
| 3,728,750 | A | 4/1973 | Stillman et al. | |
| 3,763,909 | A | 10/1973 | Stover, III | |
| 3,843,984 | A | 10/1974 | Bagheri et al. | |
| 3,925,876 | A | 12/1975 | Curtis | |
| 4,293,263 | A | 10/1981 | Zankl | |
| 5,467,672 | A | 11/1995 | Ashby | |
| 5,467,874 | A | 11/1995 | Whitaker | |
| 5,501,124 | A * | 3/1996 | Ashby | B25B 13/463 81/62 |
| 6,516,692 | B1 | 2/2003 | Hsien | |
| 6,691,594 | B2 * | 2/2004 | Chen | B25B 13/463 81/61 |
| 6,912,935 | B2 * | 7/2005 | Hsien | B25B 13/463 192/43.2 |
| 7,010,831 | B1 | 3/2006 | Beck et al. | |
| 7,263,918 | B1 | 9/2007 | Chen | |
| 7,299,720 | B1 | 11/2007 | Schultz et al. | |
| 7,987,747 | B2 * | 8/2011 | Ross | B25B 13/463 81/63.1 |
| RE44,655 | E | 12/2013 | Ross et al. | |
| 10,016,880 | B2 | 7/2018 | Chung | |
| 10,406,658 | B2 * | 9/2019 | MacDonald | B25B 23/0035 |
| 2006/0065080 | A1 | 3/2006 | Davidson et al. | |
| 2006/0213334 | A1 | 9/2006 | Lee | |
| 2008/0245194 | A1 | 10/2008 | Ross et al. | |
| 2013/0118311 | A1 | 5/2013 | Bender et al. | |
| 2018/0099385 | A1 * | 4/2018 | Chung | B25B 13/463 |

FOREIGN PATENT DOCUMENTS

| | | | |
|---|---|---|---|
| CN | 102019595 | A | 4/2011 |
| CN | 104044104 | A | 9/2014 |
| CN | 108626269 | A | 10/2018 |
| GB | 584232 | A | 1/1947 |
| GB | 2562153 | A | 11/2018 |
| TW | 547260 | | 8/2003 |
| TW | 201834792 | A | 10/2018 |

OTHER PUBLICATIONS

Combined Search and Examination Report for Application No. GB1912583.0 dated Feb. 17, 2020, 6 pages.

Taiwan Office Action for Application No. 10921055400 dated Nov. 3, 2020, 14 pages.

Canadian Office Action for Application No. 3054906 dated Dec. 8, 2020, 4 pages.

Chinese Office Action for Application No. 202010086584.4 dated Apr. 20, 2021, 8 pages.

Taiwan Office Action for Application No. 11020184660 dated Mar. 2, 2021, 4 pages.

Taiwan Office Action for corresponding TW Application No. 109104596, dated Dec. 27, 2021, 15 pages.

United Kingdom Office Action for corresponding UK Application No. GB1912583.0, dated Jan. 24, 2022, 5 pages.

Combined Search and Examination Report for corresponding Application No. GB2208824.9 dated Aug. 22, 2022, 7 pages.

Examination Report for corresponding United Kingdom Application No. GB2208824.9 dated Mar. 24, 2023, 5 pages.

* cited by examiner

TOOL WITH DOUBLE LEAF SPRING

TECHNICAL FIELD OF THE INVENTION

The present invention relates generally to ratchet wrenches. More particularly, the present invention relates to ratchet wrenches having a dual pawl with a spring bias member.

BACKGROUND OF THE INVENTION

Ratchet wrenches are common hand tools used to apply torque to work pieces. Ratchet wrenches include a pawl mechanism that allows the tool to torque a work piece in a first rotational direction by rotating the tool in that rotational direction, and then return the tool to its original position by rotating the tool in a second rotational direction opposite the first rotational direction. The pawl mechanism engages a drive gear to "lock" the gear to impart the torque in the first rotational direction, but allows the pawl to slip relative to the drive gear in the second rotational direction. A reversing lever can reverse which of the first and second rotational directions applies torque to the work piece, for example, if the work piece is left hand threaded or if the user is using the tool to remove the work piece from its position.

Two pawl ratchet wrenches require the pawl to disengage the gear in order to ratchet. Typically, this requires the gear to rotate an angle equal to about two to three times the tooth pitch of the pawl teeth. Prior ratchet wrenches attempt to solve this problem by including a bias member that urges the pawl into engagement with the drive gear, but this arrangement requires a spacer for the spring to pivot and sit within.

SUMMARY OF THE INVENTION

The present invention broadly comprises a dual pawl ratchet tool with a leaf spring bias member. The leaf spring includes two bias portions coupled together by a fulcrum. The fulcrum can be placed in an indent of the pawl pocket to maintain structural stability while applying a bias force against the engaged pawl. In doing so, the bias member reduces the amount of lost motion incurred during the ratcheting operation.

In particular, the present invention broadly comprises a tool having a handle, a head extending from the handle and including a cavity defined therein and an indent within the pocket, and a drive gear disposed within the pocket and adapted to provide torque to work pieces. The tool can further include first and second pawls adapted to engage the drive gear, a reversing lever coupled to the first and second pawls that causes either the first or second pawl to engage the drive gear depending on a position of the reversing lever, and a bias member having first and second bias portions coupled together by a fulcrum, the first and second bias members respectively applying bias to the first and second pawls, depending on the position of the reversing lever, wherein the fulcrum is positioned within the indent. When the first pawl engages the drive gear, the first bias member biases the first pawl into engagement with the drive gear, and when the second pawl engages the drive gear, the second bias member biases the second pawl into engagement with the drive gear.

Further disclosed is a tool including a handle, a head extending from the handle and including a pocket defined therein and an indent within the pocket, and a drive gear disposed within the pocket and adapted to provide torque to work pieces. The tool can further include first and second pawls adapted to meshingly engage the drive gear, and a bias member having first and second bias portions coupled together by a fulcrum positioned within the indent. When the first pawl engages the drive gear, the first bias member biases the first pawl into engagement with the drive gear, and when the second pawl engages the drive gear, the second bias member biases the second pawl into engagement with the drive gear.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
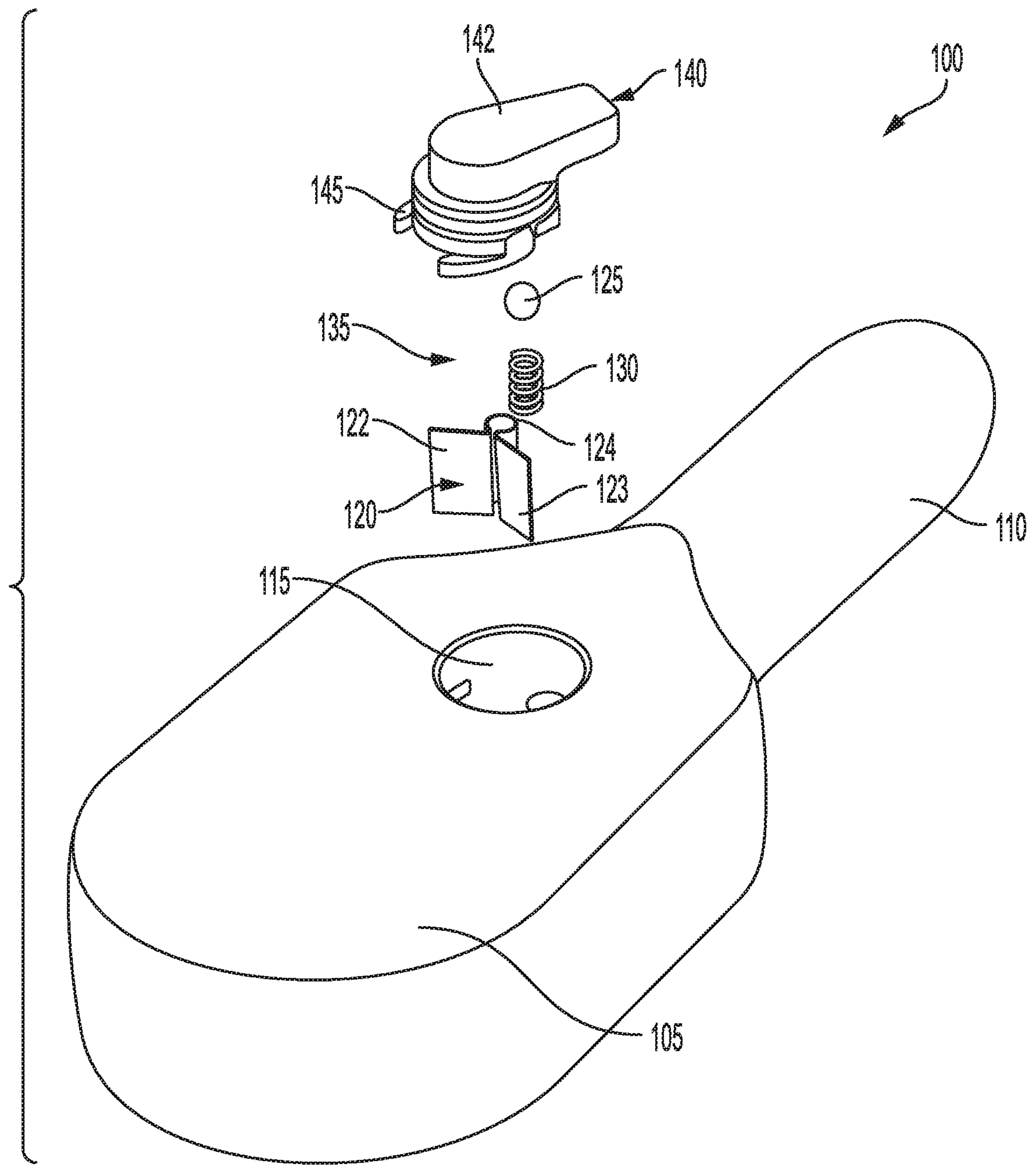
FIG. 1 is a top perspective exploded view of a tool according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises a tool with multiple pawls that are biased into engagement with gear teeth circumferentially disposed on a drive gear by a bias member. The bias member can be a leaf spring that includes two bias portions that are coupled to one another by a fulcrum. The tool can include a pawl pocket that defines an indent where the fulcrum can be disposed when assembled to maintain structural stability of the bias member while the bias member applies a bias force against the pawl to be engaged with the gear teeth. In doing so, the bias member reduces the amount of lost motion incurred during a ratcheting operation.

Figure 2A:
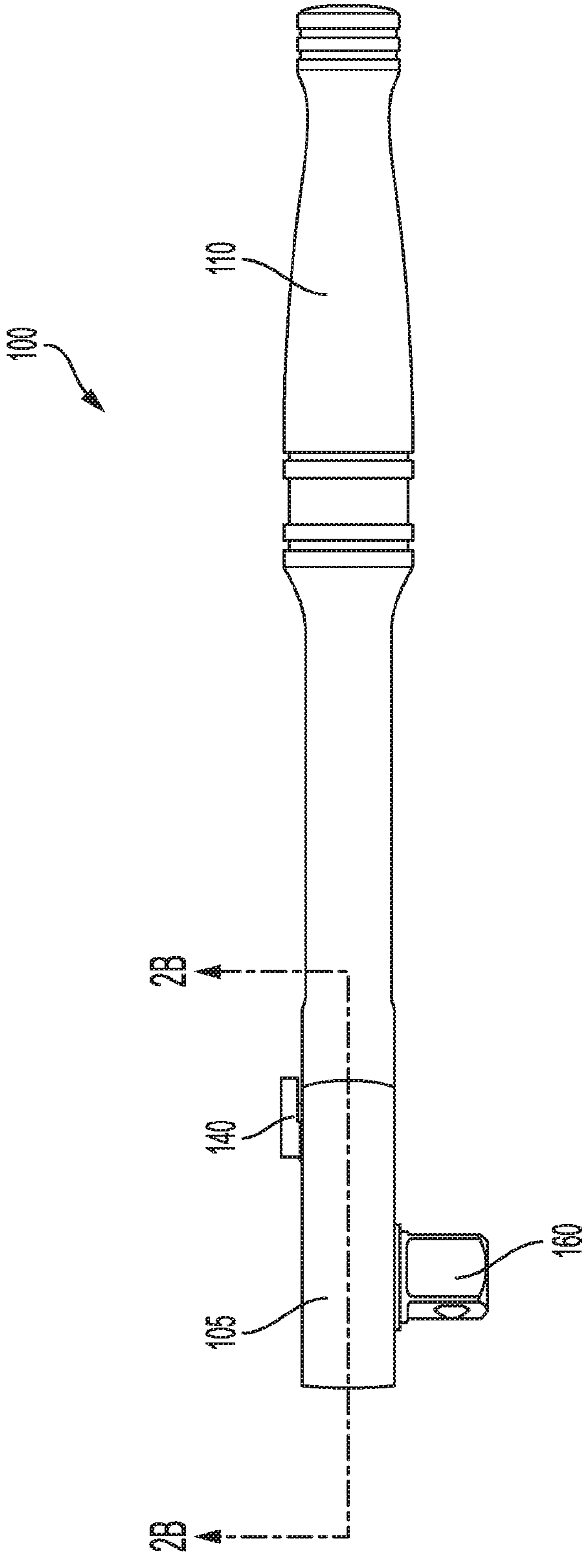
FIG. 2A is a side view of a tool according to an embodiment of the present invention.
Figure 2B:
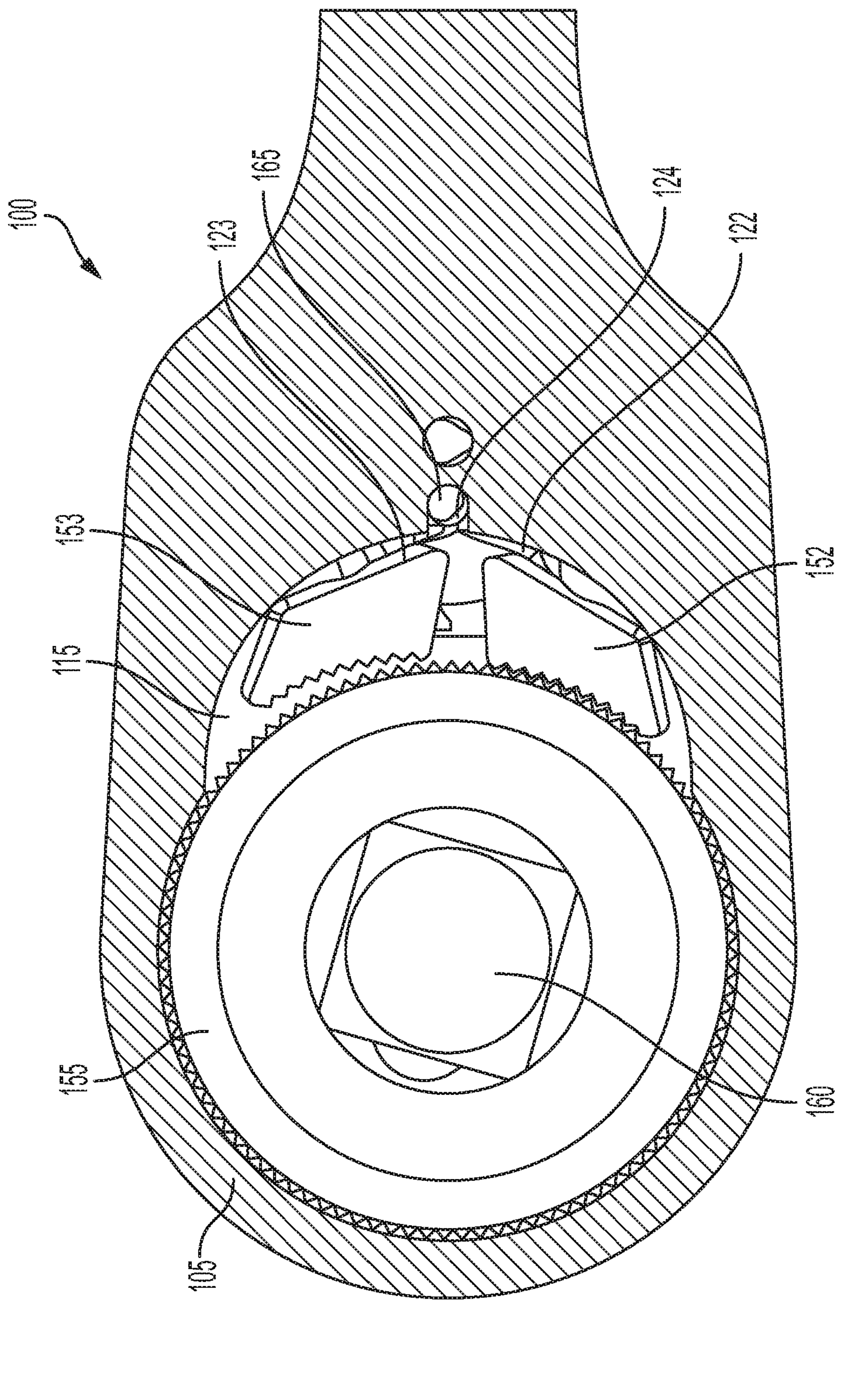
FIG. 2B is a top sectional view of a tool, taken along line 2B-2B in FIG. 2A, according to an embodiment of the present invention.
Figure 3:
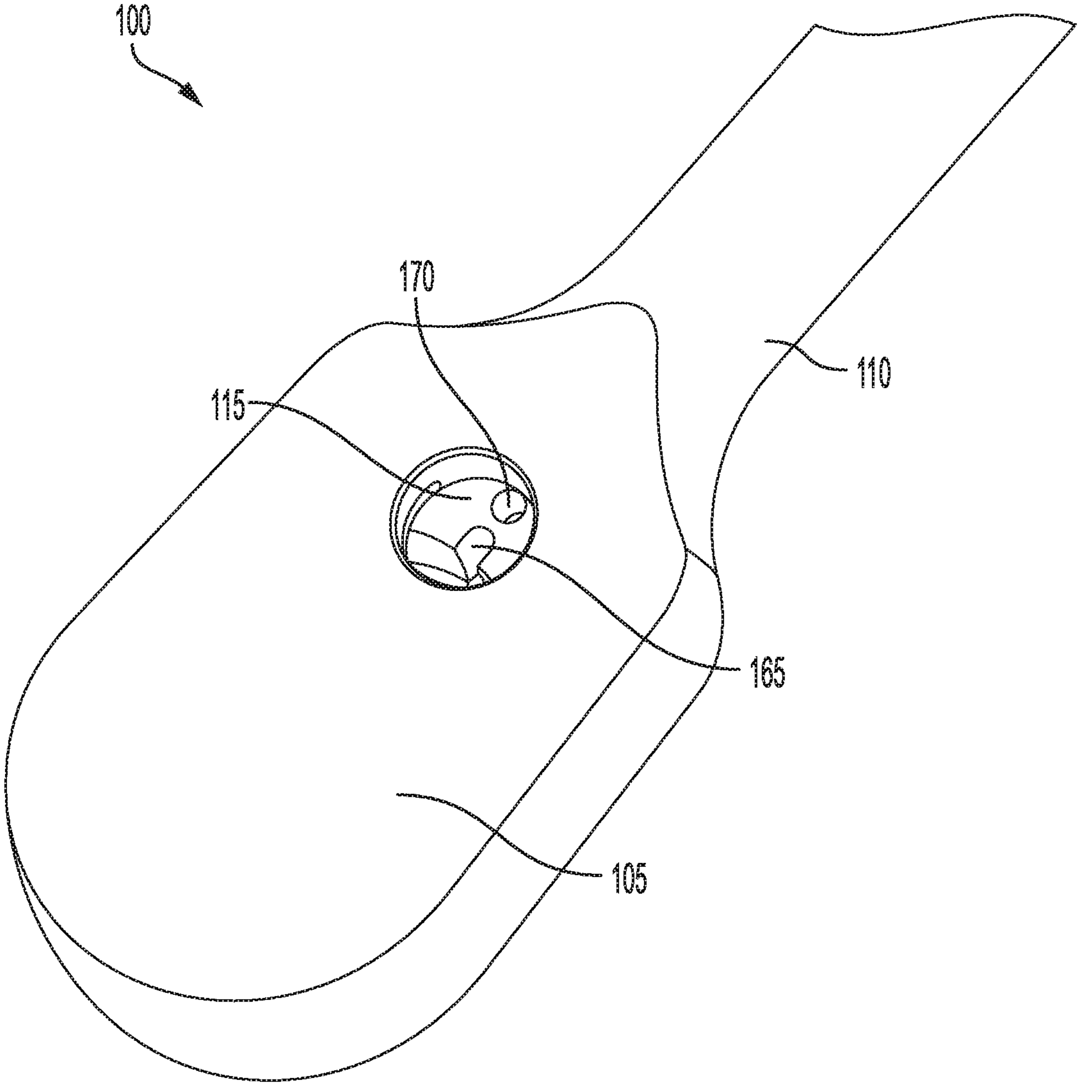
FIG. 3 is a top perspective view of a tool according to an embodiment of the present invention with the reversing lever removed.

As shown in FIGS. 1-3, at least some of the presently disclosed embodiments include a tool 100 having a head 105 and a handle 110 extending from the head 105. The head 105 can include a cavity to house the ratcheting components. A pocket 115 can be defined within the head 105 to receive a bias member 120 that is adapted to selectively bias one of the pawls into engagement with the gear teeth, as well as other mechanical components of the tool 100. The bias member 120 can include first 122 and second 123 bias portions coupled to one another by a fulcrum 124. For example, the first 122 and second 123 bias portions and the fulcrum 124 can be integral with each other. The tool 100 can further include a ball 125 and a spring 130, collectively referred to as a ball detent mechanism 135.

As shown, the tool 100 can include a reversing lever 140 that a user can turn to selectively cause the tool 100 to operate in either of the clockwise or counterclockwise directions. The reversing lever 140 can include a knob 142 that a user can grip to select the desired rotational direction that the tool 100 will apply torque in. The reversing lever 140 can also include hooks 145 that engage pawls 152, 153. For example, depending on how the reversing lever 140 is rotated, the hooks 145 will engage one of the pawls 152, 153 and cause the engaging pawl 152 to then engage the drive gear 155.

As shown in FIG. 2B, the drive gear 155 can be disposed within the head 105 to apply torque to a work piece. The first 150 and second 152 pawls can also be disposed in the head 105 to engage the drive gear 155 when the drive gear 155 is rotated in a drive rotational direction, and to slip with respect to the drive gear 155 when the drive gear 155 is rotated in a slip rotational direction opposite the drive rotational direction. The drive gear 155 can be connected to a drive lug 160 that couples with a socket, which then applies the torque to a work piece.

The tool 100 includes a type of ratchet known as a dual-pawl ratchet wrench allowing a user to selectively determine a torque direction. More specifically, the first and second pawls 152, 153 can be selectively engaged with the drive gear 155, whereas the drive gear 155 can be operatively engaged with the work piece to apply torque to the work piece. When the first pawl 152 is engaged with the drive gear 155, torque drive is permitted with rotation of the tool 100 in a first rotational drive direction while slippage occurs with rotation of the tool 100 in a second rotational direction opposite the first rotational direction. Conversely, when the second pawl 153 is engaged with the drive gear 155, the first pawl 152 moves out of engagement with the drive gear 155, and torque drive is permitted with rotation of the tool 100 in the second rotational direction while slippage occurs in the first rotational direction.

As described, the reversing lever 140 is configured to select one of the pawls 152, 153 to thereby select a rotational direction in which the tool 100 can apply torque. For example, one of the hooks 145 of the reversing lever 140 can engage one of the pawls 152, 153 and cause the engaging pawl 152 to then engage the drive gear 155. In doing so, the reversing lever 140 will cause the other of the pawls 153 to disengage from the drive gear 155. The end result is that the engaging pawl 152 will cause its teeth to engage with the teeth of the drive gear 155, allowing the engaging pawl 152 to slip when the handle 110 is rotated in a first rotational direction (as shown in FIG. 3, when the handle 110 is rotated in the clockwise direction) and to grip the drive gear 155 to allow torque to be applied in a second rotational direction opposite the first rotational direction (as shown in FIG. 3, when the handle is rotated in the counterclockwise direction).

As discussed above, the pawls 152, 153 can incur lost motion when engaging the drive gear 155 unless the engaging pawl 152 is biased into engagement with the gear teeth of the drive gear 155. For this reason, at least some of the presently disclosed embodiments implement the bias member 120 to bias the engaging pawl 152 into engagement with the gear teeth of the drive gear 155. For example, the first bias portion 122 can engage the first pawl 152 when the first pawl 152 is the engaging pawl, and the second bias portion 123 can engage the second pawl 153 when the second pawl 153 is the engaging pawl. FIG. 2B illustrates one such example of the pawl mechanism where the non-engaging second pawl 153 is not biased into engagement by its corresponding second bias portion 123. Here, the first bias portion 122 biases the first pawl 152 into engagement with the drive gear 155 to limit lost motion in the ratcheting operation. As shown, the bias member 120 is a leaf spring but in some embodiments the bias member 120 can be another member that imparts bias to the pawls 152, 153.

As shown in FIGS. 2B and 3, the pocket 115 can include an indent 165 where the fulcrum 124 can be disposed. The indent 165 allows the fulcrum 124 to be maintained in a working location during use and to allow insertion of the flexible bias member 120 during assembly of the tool 100. For example, the fulcrum 124 can be circular shaped and the indent 165 can similarly be circular shaped to allow the fulcrum 124 to fit inside. The fulcrum 124 can bend during insertion into the indent 165 for ease of assembly. By positioning the fulcrum 124 in the indent 165, a separate spacer is not required, as with conventional dual pawl ratchet tools. The indent 165 can therefore allow for a structurally stable, compact bias member that applies a bias force to the pawls 152, 153 during use to limit the amount of lost motion during the ratchet mechanism.

The ball detent mechanism 135 is positioned within the pocket 115 of the head 105 and is biased in an upwardly direction, towards the bottom of the reversing lever 140. The reversing lever 140 can include partially-spherical divots that receive the ball 125 when the reversing lever 140 is rotated a permissible amount either clockwise or counterclockwise. The ball 125 can therefore provide a tactile indication to the user that the reversing lever 140 has reached the desired rotational engagement direction, and further detain the reversing lever 140 in the desired position. As shown in FIG. 3, the ball detent mechanism 135 can be disposed within a depression 170 of the head 105, but the ball detent mechanism 135 can be located in any location so long as it provides a tactile indication to the user when the desired rotational engagement direction is reached.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A ratcheting tool having a handle with a head extending from the handle, a cavity disposed in the head and formed by a sidewall, a drive gear disposed in the cavity and having circumferentially disposed gear teeth, first and second pawls adapted to selectively engage the gear teeth, and a reversing lever coupled to the first and second pawls to selectively cause either one of the first or second pawls to engage the gear teeth, the ratcheting tool comprising:

a pocket disposed in the cavity and defined by a rear portion of the sidewall distal to the drive gear, wherein the first and second pawls are disposed in the pocket between the drive gear and the rear portion of the sidewall;

an indent disposed in the rear portion of the sidewall;

a bias member having first and second bias portions with a fulcrum disposed therebetween, the fulcrum is disposed in the indent and the first and second bias portions are disposed in the pocket and respectively apply bias to the first and second pawls, depending on the position of the reversing lever, wherein when the first pawl is selected to engage the gear teeth, the first bias portion biases the first pawl into engagement with the gear teeth, and when the second pawl is selected to engage the gear teeth, the second bias portion biases the second pawl into engagement with the gear teeth.

2. The tool of claim 1, further comprising a ball detent mechanism including a ball and a spring biasing the ball towards the reversing lever, the ball detent mechanism is disposed in the head.

3. The tool of claim 2, further comprising a depression disposed in the head, and wherein the ball detent mechanism is located within the depression.

4. The tool of claim 1, wherein the bias member is flexible such that the fulcrum is insertable into the indent.

5. The tool of claim 1, wherein the first and second bias portions and the fulcrum are integral with one another.

6. The tool of claim 1, wherein the reversing lever includes a knob and first and second hooks opposite the knob.

7. The tool of claim 6, wherein the first and second hooks are respectively adapted to engage the first and second pawls based on the rotation of the reversing lever.

8. The tool of claim 1, wherein the fulcrum has a circular cross-sectional shape.

9. The tool of claim 8, wherein the fulcrum is tubular.

10. The tool of claim 8, wherein the first and second bias portions are leaf portions.

11. The tool of claim 1, wherein the indent includes an opening facing in a direction towards the pocket.

12. A tool comprising:

a handle;

a head extending from the handle, a cavity disposed in the head and formed by a sidewall, a pocket defined in the cavity by a rear portion of the sidewall, and an indent disposed in the rear portion of the sidewall;

a drive gear having circumferentially disposed gear teeth disposed within the cavity;

first and second pawls disposed in the pocket between the drive gear and the rear portion of the sidewall and adapted to selectively engage the gear teeth;

a reversing lever adapted to selectively cause either the first or second pawls to engage the gear teeth; and a bias member having first and second bias portions with a fulcrum disposed therebetween, wherein the fulcrum is disposed in the indent and the first and second bias portions are disposed in the pocket, wherein when the first pawl is selected to engage the gear teeth, the first bias portion biases the first pawl into engagement with the gear teeth, and when the second pawl is selected to engage the gear teeth, the second bias portion biases the second pawl into engagement with the gear teeth.

13. The tool of claim 12, wherein the reversing lever is operatively coupled to the first and second pawls, and wherein the first and second bias portions respectively apply bias to the first and second pawls, depending on the position of the reversing lever.

14. The tool of claim 12, further comprising a ball detent mechanism including a ball and a spring biasing the ball towards the reversing lever, the ball detent mechanism is disposed in the head.

15. The tool of claim 14, further comprising a depression disposed in the head, and wherein the ball detent mechanism is located within the depression.

16. The tool of claim 12, wherein the bias member is flexible such that the fulcrum is insertable into the indent.

17. The tool of claim 12, wherein the first and second bias portions and the fulcrum are integral with one another.

18. The tool of claim 12, wherein the reversing lever includes a knob and first and second hooks opposite the knob.

19. The tool of claim 18, wherein the first and second hooks are respectively adapted to engage the first and second pawls based on the rotation of the reversing lever.

* * * * *